US007971261B2

(12) United States Patent
Pestoni

(10) Patent No.: US 7,971,261 B2
(45) Date of Patent: Jun. 28, 2011

(54) DOMAIN MANAGEMENT FOR DIGITAL MEDIA

(75) Inventor: Florian Pestoni, Mountainview, CA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 11/811,843

(22) Filed: Jun. 12, 2007

(65) Prior Publication Data

US 2008/0313264 A1 Dec. 18, 2008

(51) Int. Cl.
*G06F 21/00* (2006.01)
(52) U.S. Cl. ............................... 726/27; 705/59; 705/51
(58) Field of Classification Search .................. 705/59
See application file for complete search history.

(56) References Cited

U.S. PATENT DOCUMENTS

| | | | |
|---|---|---|---|
| 7,114,168 B1 | 9/2006 | Wyatt et al. | |
| 7,424,747 B2 * | 9/2008 | DeTreville ....................... | 726/32 |
| 2002/0157002 A1 | 10/2002 | Messerges et al. | |
| 2003/0135756 A1 * | 7/2003 | Verma ........................... | 713/201 |
| 2004/0103312 A1 | 5/2004 | Messerges et al. | |
| 2005/0071280 A1 * | 3/2005 | Irwin et al. ....................... | 705/59 |
| 2005/0071663 A1 | 3/2005 | Medvinsky et al. | |
| 2005/0102513 A1 * | 5/2005 | Alve .............. | 713/168 |
| 2005/0182727 A1 * | 8/2005 | Robert et al. ................... | 705/51 |
| 2005/0182931 A1 | 8/2005 | Robert et al. | |
| 2005/0289072 A1 * | 12/2005 | Sabharwal ....................... | 705/59 |
| 2006/0251252 A1 | 11/2006 | Quan | |
| 2007/0056040 A1 | 3/2007 | Van Den Heuvel et al. | |
| 2007/0061886 A1 | 3/2007 | Le | |
| 2008/0229387 A1 * | 9/2008 | Baks et al. ........................ | 726/1 |
| 2008/0255994 A1 * | 10/2008 | Schnell et al. .................. | 705/52 |

FOREIGN PATENT DOCUMENTS

| | | |
|---|---|---|
| WO | 2005111760 A1 | 11/2005 |
| WO | 2006038204 A1 | 4/2006 |
| WO | 2006107185 A1 | 10/2006 |
| WO | 2006117555 A2 | 11/2006 |

OTHER PUBLICATIONS

"Content Protection Systems", pp. 1-2, http://www.itea-office.org/attachments/138/Cops_contribution_ITEA_programme_report_2005.pdf.
Coral Consortium Whitepaper, Feb. 2006, pp. 1-15, Fremont, CA, USA.
Digital Video Broadcasting (DVB); Content Protection & Copy Management, Nov. 2005, pp. 1-103.
"DRM: creating a trusted domain", Date: Sep.-Oct. 2002, pp. 23-24, Cable & Satellite International.
Hibbert, et al., "A Copy Protection and Content Management System from the DVB", pp. 1-6, http://www.dvb.org/documents/newsletters/DVB-SCENE-05-CopyProtectionArticle.pdf.

* cited by examiner

*Primary Examiner* — Matthew B Smithers

(57) ABSTRACT

In accordance with the domain management for digital media, a device accesses a domain administrator in order to obtain a domain membership license. The domain membership license indicates that the device is part of a domain that includes multiple devices associated with a user of the device. The device also obtains multiple pieces of protected content from multiple content providers, with two or more of the multiple content providers employing different digital rights management systems. The device also accesses a license server to obtain, for each piece of protected content, a content license that is bound to the domain. The content license permits the device to play back the piece of content to the user.

20 Claims, 6 Drawing Sheets

300

DOMAIN MANAGEMENT FOR DIGITAL MEDIA

BACKGROUND

As computing technology has advanced, digital media playback devices have become increasingly commonplace. Examples of such digital media playback devices include portable music players, desktop and laptop computers, handheld computers or personal digital assistants (PDAs), cellular phones, and so forth. These devices frequently employ digital rights management (DRM) techniques in order to protect the rights of the artists and/or copyright owners of the digital media. Users frequently have multiple playback devices, and as such they oftentimes desire to have the same digital media available for playback on all of their playback devices. However, this can be problematic because the DRM techniques oftentimes interfere with the ability to copy the digital media to, and play the digital media on, multiple devices. This problem is exacerbated by the fact that different content providers and different playback devices can employ different, and typically incompatible, DRM techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a device accesses a domain administrator in order to obtain a domain membership license. The domain membership license indicates that the device is part of a domain that includes multiple devices associated with a user of the device. The device also obtains multiple pieces of protected content from multiple content providers, with two or more of the multiple content providers employing different digital rights management systems. The device also accesses a license server to obtain, for each piece of protected content, a content license that is bound to the domain. The content license permits the device to play back the piece of content to the user.

In accordance with one or more aspects, the domain membership license includes a device identifier that identifies a device to which the domain membership license is bound, and a domain identifier that identifies a domain of which the device is a member. The domain membership license further includes a private key of a public/private key pair of the domain, and a digital certificate for the domain.

BRIEF DESCRIPTION OF THE DRAWINGS

The same numbers are used throughout the drawings to reference like features.

DETAILED DESCRIPTION

Domain management for digital media is described herein. A user is associated with a particular domain, and each of the user's media playback devices communicates with a domain administrator to obtain a domain membership license. Each device can also obtain protected (encrypted) content, and access a license server to obtain a valid content license in order to play back the protected content. The license server binds the license to the user's domain, allowing the device, as well as any other of the user's devices that have obtained a domain membership license, to decrypt the protected content for playback. Additionally, following this protocol for obtaining and using domain membership licenses and content licenses, the device is able to obtain and play back content from content providers employing different digital rights management (DRM) techniques.

Figure 1:
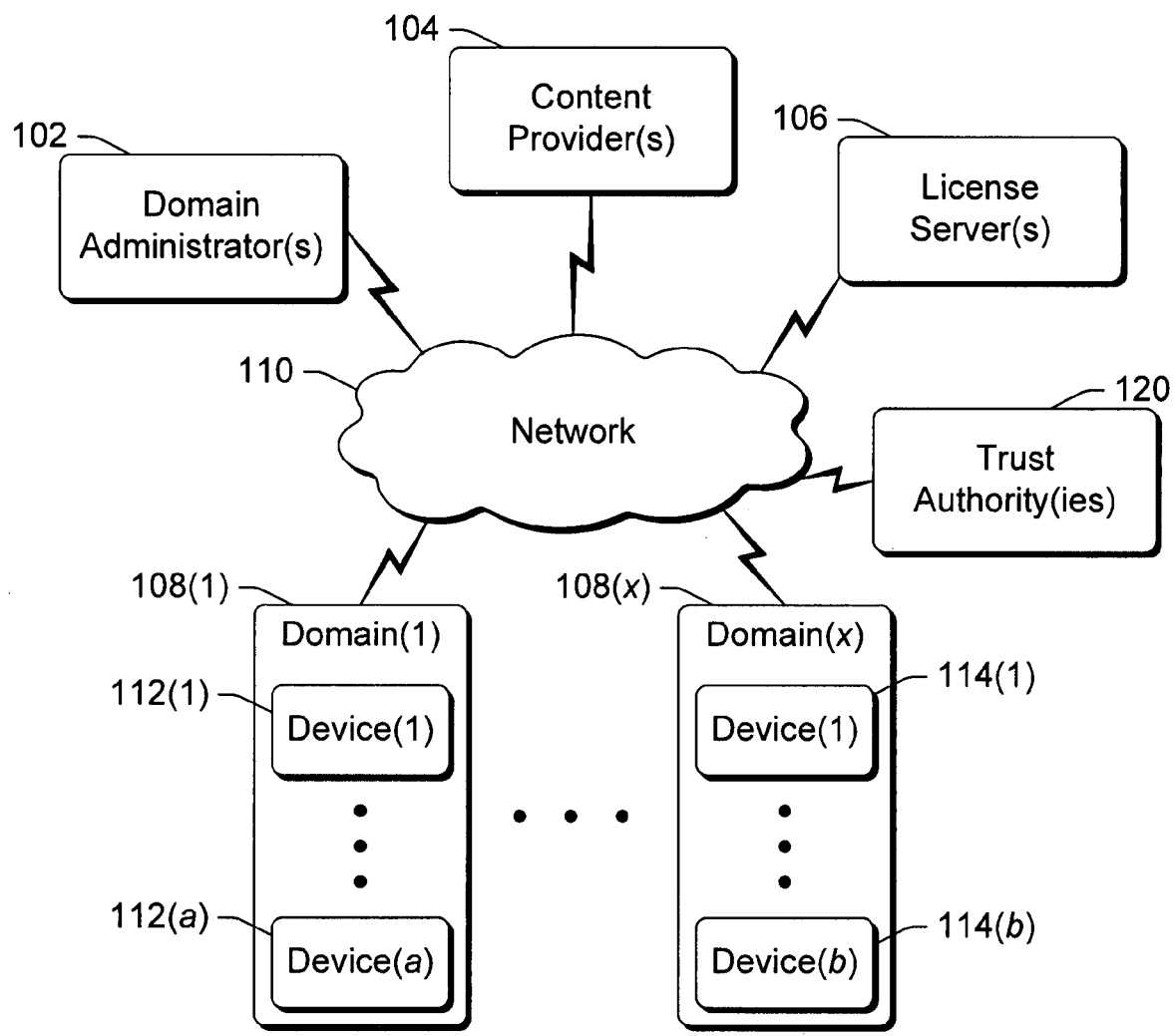
FIG. 1 illustrates an example system in which the domain management for digital media can be employed.

FIG. 1 illustrates an example system 100 in which the domain management for digital media can be employed. System 100 includes one or more domain administrators 102, one or more content providers 104, one or more license servers 106, multiple (x) domains 108(1), . . . , 108(x), and one or more trusted authorities 120. Each of these components 102, 104, 106, 108, and 120 can communicate with one another over network 110. Network 110 can be any of a variety of networks, such as the Internet, a local area network, a cellular phone network, other public and/or proprietary networks, combinations thereof, and so forth.

Each of domain administrator(s) 102, content provider(s) 104, license server(s) 106, and trust authority(ies) 120 represents a service that can be implemented on one or more computing devices. Two or more of these services can optionally be implemented on a single computing device. One or more of domain administrator(s) 102, content provider(s) 104, license server(s) 106, and trust authority(ies) 120 can be combined into a single service, or alternatively each can be a separate service.

Each domain 108 includes one or more devices, illustrated as devices 112(1), . . . , 112(a) and 114(1), . . . , 114(b). Each of these devices 112, 114 that is included in a domain is also referred to as being a member of that domain. Devices 112, 114 represent any of a variety of different types of digital media playback devices, such as desktop computers, laptop computers, handheld computers or personal digital assistants (PDAs), automotive computers, portable music players, portable movie players, cellular phones, and so forth. Each of devices 112, 114 can be any type of device capable of playing back digital media. The digital media can be any of a variety of types of content, such as audio content, movie content, image content, textual content, graphics content, and so forth, as well as combinations of one or more of these different types of content.

Each domain 108 is associated with a particular user or group of users. Digital media is bound to the user's domain, allowing any of the devices 112, 114 that are part of that user's domain to play back the digital media that is bound to his or her domain. The different devices 112, 114 in a particular domain 108 can be different types of digital media playback devices, or alternatively one or more of devices 112, 114 can be the same type of device. For example, a user may have his or her desktop computer, portable music player, cellular phone, and automotive computer all part of his or her domain, and all of these devices can play back digital media that is bound to his or her domain. A particular device 112, 114 can be a member of one or more domains 108. Furthermore, it should be noted that the devices 112, 114 within a domain 108 need not be aware of, and typically are not aware of, the other devices 112, 114 that are within that same domain.

Domain administrator 102 manages the domains 108. Management of a domain refers to controlling membership in the domain and imposing restrictions on members of the domain, including adding devices to the domain, removing devices from the domain, generating and distributing domain membership licenses, and so forth. When a device 112, 114 joins a domain, the device 112, 114 is given a domain membership license for that domain from domain administrator 102. This domain membership license, along with a content license, allows the device to access and play back any protected content that has been bound to that domain, as discussed in more detail below.

Content provider 104 provides pieces of content (pieces of digital media) to devices 112, 114. The pieces of content provided to devices 112, 114 are typically protected content. The protected content is protected through encryption, with decryption keys being included in content licenses associated with the protected content. Each content license is bound to a particular domain 108, so only those devices that are part of the particular domain 108 can use the content license to decrypt and play back the protected content, as discussed in more detail below.

A piece of content refers to data that can be presented to the user. How a piece of content is defined can vary based on the type of content as well as the desires of the creator of the piece of content and/or the creator or administrator of content provider 104. For example, a piece of content may be an entire song, multiple songs, a portion(s) of a song, an entire image, multiple images, a portion(s) of an image, an entire movie, multiple movies, a portion(s) of a movie, and so forth. Creators of different pieces of content, and/or the creator or administrator of content provider 104, can define and create pieces of content as they desire.

License server 106 provides content licenses to devices 112, 114. Content obtained by devices 112, 114 from content provider 104 is protected. The devices 112, 114 access license server 106 to obtain a content license for the protected content. The content license is bound to a particular domain, so any of the devices 112, 114 that are within that particular domain can use the content license to access and play back the protected content. However, devices 112, 114 that are not within that particular domain cannot use the content license to access and play back the protected content. Such devices would need a content license bound to the domain that they are members of.

Trust authority 120 digitally signs and issues digital certificates. Trust authority 120 is an entity, typically a service implemented on one or more computing devices, that is trusted by domain administrator 102, content provider 104, and license server 106. Trust authority 120 acts as a trusted third party that can issue digital certificates to devices 112, 114 that attest to the authenticity of the devices 112, 114. Trust authority 120 can also issue a certificate that allows another entity (such as a device manufacturer) to issue such digital certificates to devices 112, 114, thereby delegating the digital certificate issuance to this other entity.

Figure 2:
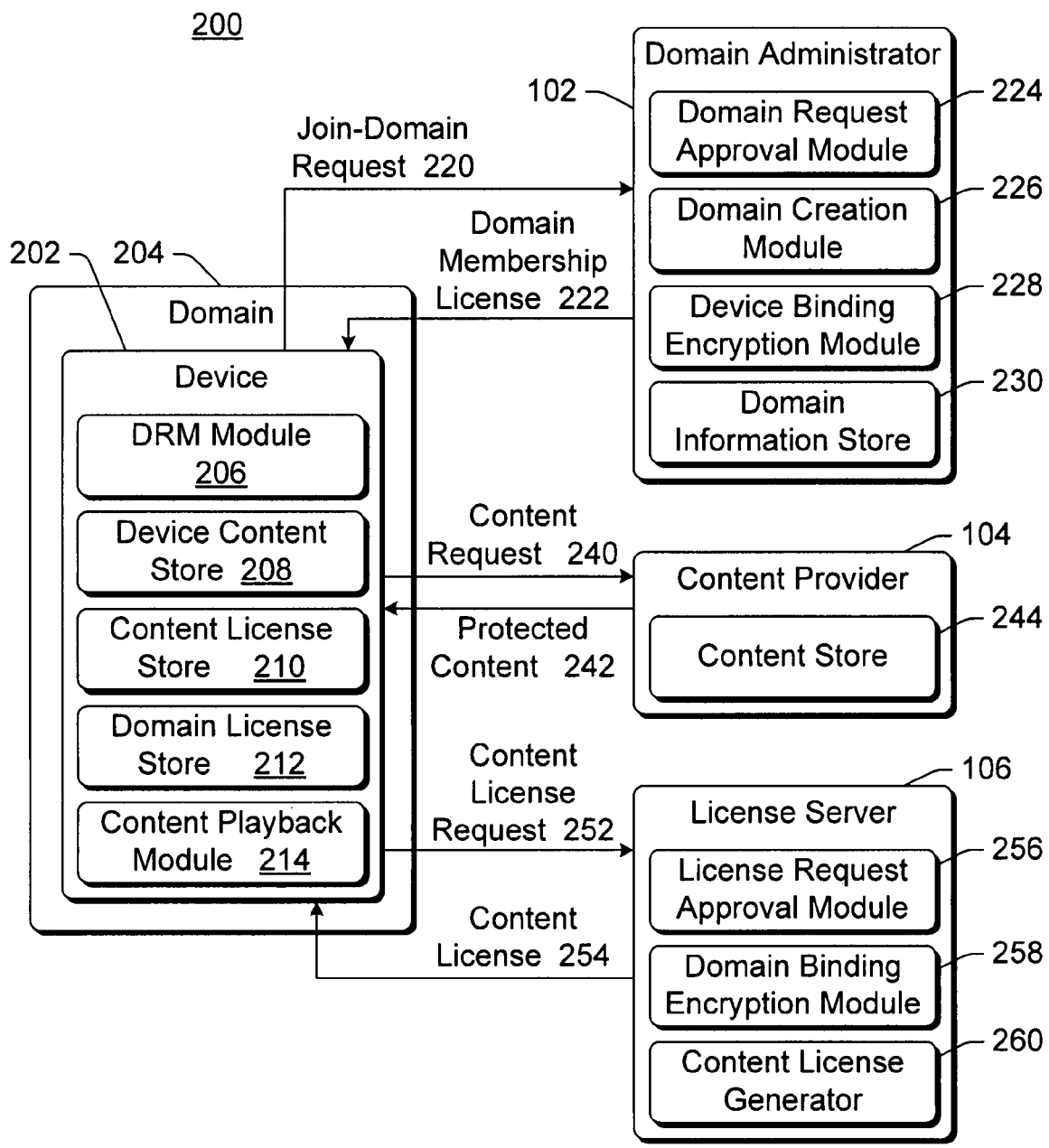
FIG. 2 illustrates a more detailed example system in which the domain management for digital media can be employed.

FIG. 2 illustrates a more detailed example system 200 in which the domain management for digital media can be employed. For ease of explanation, FIG. 2 illustrates a single domain administrator 102, a single content provider 104, a single license server 106, and a single device 202. However, it is to be appreciated that, as discussed above with respect to FIG. 1, multiple such components could be included in system 200. Communication among these components 102, 104, 106, and 202 can be carried out over a network such as network 110 of FIG. 1.

FIG. 2, as well as other figures, is discussed with reference to public key cryptography and public/private key pairs. Public key cryptography is well-known to those skilled in the art. Nonetheless, a brief overview of public key cryptography is included here to assist the reader. In public key cryptography, an entity (such as a hardware or software component, a device, a domain, and so forth) has associated with it a public/private key pair. The public key can be made publicly available, but the entity keeps the private key a secret. Without the private key it is computationally very difficult to decrypt data that is encrypted using the public key, and without the public key it is computationally very difficult to decrypt data that is encrypted using the private key. So, if entity A desires to send data securely to entity B, entity A encrypts the data with the public key of entity B. Thus, entity B can readily decrypt the data, but other entities cannot because the other entities do not have the private key of entity B. Additionally, entity B can generate a digital signature for data by encrypting the data with the private key of entity B, and then make the data as well as the digital signature available to other entities. Any other entity can decrypt the encrypted data using the public key of entity B and compare the decrypted data to the data made available by entity B; if the comparison indicates that the decrypted data and the data made available by entity B are the same then the entity can be assured that no one has tampered with or altered the data that was digitally signed by entity B.

FIG. 2, as well as other figures, is also discussed with reference to digital certificates. Digital certificates are well-known to those skilled in the art. Nonetheless, a brief overview of digital certificates is included here to assist the reader. A digital certificate can be generated by a trust authority that attests to the trustworthiness of a particular entity. The digital certificate is digitally signed by a trust authority using a private key of the trust authority. If entity A desires to verify the trustworthiness of entity B, then entity A can obtain the public key of the trust authority (which in some embodiments can be entity A) and verify the digital signature of the digital certificate. As the trust authority is trusted by entity A, entity B can be verified as being trusted if the digital signature of the digital certificate is verified as being correct.

Various communications among device 202, domain administrator 102, content provider 104, and license server 106 are discussed herein. These communications describe a protocol that is followed by these components 102, 104, 106, and 202 to bind content to domains and manage the domains. Using this protocol, any device 202 that is a member of a domain can access and play back content that is bound to that domain.

Device 202 is a digital media playback device. Device 202 is, for example, any of devices 112, 114 of FIG. 1. Device 202 is part of a domain 204. Multiple devices can be a part of domain 204, although only a single device is illustrated in FIG. 2.

Device 202 includes a digital rights management (DRM) module 206, a device content store 208, a content license store 210, a domain license store 212, and a content playback module 214. Although illustrated as being separate, one or more of modules 206 and 214, and stores 208, 210, and 212 can alternatively be combined.

DRM module 206 implements the digital rights management techniques for device 202. Digital rights management refers to the protection of the rights of the artists, publishers, and/or copyright owners of digital content. Generally, DRM can employ various techniques such as conditional access, copy protection, content protection, and so forth. The specific manner in which these techniques are implemented can vary by DRM system.

The DRM techniques are employed to protect content from improper playback (playback that does not conform to the constraints dictated by the owner of the copyright of the content and/or the distributor of the content). The constraints on the use of the content are made known to device 202, typically as part of a content license as discussed in more detail below. Alternatively, the constraints could be made known in other manners, such as pre-programmed into DRM module 206, separate notification being given of the constraints (e.g., a separate message sent to device 202, or obtaining the constraints from a web site, etc.), and so forth.

The protected content is typically protected by being encrypted so that the content can only be played back in an intelligible manner if the proper decryption key(s) is known. DRM module 206 employs various DRM techniques to determine when it is permissible to decrypt the content (in accordance with the constraints discussed above). The DRM techniques can be implemented in any of a variety of manners. For example, the DRM techniques can include verification that the operating system and/or other software executing on device 202 is trustworthy, verification that the constraints dictated by the owner of the copyright of the content and/or the distributor of the content have been satisfied, verification that a domain membership license is valid (e.g., not expired), and so forth. Various different DRM techniques are known to those skilled in the art, and any such techniques can be used by DRM module 206.

It should be noted that different devices 202 can employ different DRM techniques. For example, some devices 202 can use the Windows Media® DRM product, while other devices 202 can use the FairPlay digital rights management techniques. Additional information on the Windows Media® DRM product is available from Microsoft Corporation of Redmond, Wash. Additional information on the FairPlay digital rights management techniques is available from Apple Inc. of Cupertino, Calif.

Device content store 208 stores content that is obtained from content provider 104. Content provider 104 is typically a remote device or service from which protected (e.g., encrypted) content can be obtained. Content provider 104 could alternatively be another local device (e.g., another device 112, 114 of FIG. 1 that is part of domain 204 or alternatively part of another domain), a local media device (e.g., a compact disc (CD) or digital versatile disc (DVD)), and so forth. Device content store 208 is typically implemented as part of device 202, although all or a portion of device content store 208 may alternatively be implemented on a separate device. Additionally, device content store 208 may be implemented at least in part on removable media, such as a Flash memory card, a portable hard drive, and so forth.

It should be noted that some of the content obtained by device 202 may not be protected content. For example, some freely-distributed content may be obtained by device 202, content may be copied to device 202 from a CD without any protection, and so forth. How such unprotected content is handled is determined by content playback module 214 without needing to involve DRM module 206. The techniques discussed herein are used for the management of domains and protected content, and do not need to be employed for unprotected content.

Content license store 210 stores content licenses that are obtained from license server 106. As discussed in more detail below, a content license binds particular content to a particular domain. So, content bound to domain 204 can be accessed and played back by device 202.

Domain license store 212 stores domain membership licenses that have been issued to device 202. Domain membership licenses allow device 202 to access the information in content licenses and extract the appropriate information from the content licenses to allow device 202 to play back the content. Domain membership licenses are discussed in more detail below.

Device 202 also includes a content playback module 214. Content playback module 214 accesses and plays back content for a user of device 202. Content playback module 214 can be a separate module as illustrated, or alternatively can be incorporated into another module (such as DRM module 206).

During operation, a device 202 can perform various operations. These operations include joining a domain, obtaining a content license to play back particular content, and obtaining content. Each of these operations is discussed in more detail below.

Device 202 can join a domain, such as domain 204. Joining a domain binds device 202 to the domain it joins. The process implemented by device 202 in joining a domain may be implemented by DRM module 206, content playback module 214, or alternatively a separate module (not shown). To join a domain, device 202 issues a join-domain request 220 to domain administrator 102. The join-domain request can be issued, for example, in response to a user request to join a particular domain, or automatically in response to some other event (e.g., device 202 first being connected to the Internet, a particular application being installed on device 202, and so forth). If allowed to join the domain as requested, device 202 becomes a member of the domain and receives a domain membership license 222 in response to join-domain request 220.

The join-domain request includes various parameters to identify device 202 as well as the domain that device 202 is requesting to join. In one or more embodiments, these parameters include a device certificate, user credentials, and optionally a device description. The device certificate is a digital certificate issued to device 202 by a trust authority (in this case, an authority trusted by domain administrator 102), such as trust authority 120 of FIG. 1. The digital certificate attests to the trustworthiness of device 202. The digital certificate can include, for example, a statement that the trust authority attests to the trustworthiness of device 202, an identifier of device 202 (e.g., a cryptographic hash of various software components of device 202, identifiers of particular hardware components of device 202, a unique identifier of device 202 that is available only if DRM module 206 determines that device 202 is operating in a trustworthy manner, and so forth), and a public key of device 202. The digital certificate also typically includes a digital signature generated by the trust authority using the private key of the trust authority, which can be used by domain administrator 102 along with the public key of the trust authority to verify that the digital certificate as presented by device 202 is the same as the digital certificate that was digitally signed by the trust authority.

Alternatively, other mechanisms may be employed to validate the trustworthiness of device 202, or the protocol may otherwise not be concerned with validating the trustworthiness of device 202. In such situations, the device certificate need not be included as a parameter in request 220.

The user credentials are various credentials that identify the user of device 202. Different users typically have different domains. The user can have each device that he or she owns join his or her domain, allowing him or her to easily play back the same content using any of his or her devices, but not allowing other users' devices that are not in his or her domain to play back the content (unless they have obtained separate content licenses for the content). Alternatively, domain administrator could employ a domain policy that allows multiple users to share a domain, allowing each device that one of these multiple users owns to join this shared domain. The user credentials can take any of a variety of different forms, such as a user id and password, a digital certificate attesting to the user's identity and digitally signed by a trust authority, and so forth.

The device description is a "user-friendly" name for the device. This information can be maintained, for example, so that the user can identify individual devices more easily.

Domain administrator 102 includes a domain request approval module 224, a domain creation module 226, a device binding encryption module 228, and a domain information store 230. Modules 224, 226, 228, and store 230 can be implemented on the same device, or alternatively can be implemented on multiple devices.

Domain request approval module 224 receives join-domain request 220 and determines whether device 202 is permitted to join the requested domain. The domain that device 202 is requesting to join is the domain of the user of device 202, as identified by the user credentials in the request. Alternatively, a user may have multiple domains, in which case the user can identify which of his or her multiple domains he or she desires to have device 202 join, and an identification of this domain can be included in request 220.

Domain request approval module 224 obtains and verifies that the user credentials from request 220 are correct. This verification can take different forms, such as comparing a password (or hash thereof) against a stored password (or hash thereof), accessing a remote service (not shown) to verify that the received password matches the received user id, determining whether the digital signature on a digital certificate attesting to the user's identity is correct, and so forth.

Domain information store 230 stores the domain information for various users. For each user, this domain information includes an identifier of the user's domain, a public/private key pair for the domain, and optionally rights associated with the domain. This domain information also includes device IDs for each device that is part of (has joined) the domain. In one or more embodiments, various restrictions (also referred to as the domain policy) can be imposed on the domains. For example, a limit as to how many devices can be part of the domain can be imposed, a limit as to how long a device can be part of the domain can be imposed, a limit as to how many devices of a particular type (e.g., portable content players) can be part of the domain can be imposed, a limit as to how frequently a user can add devices to a domain can be imposed, and so forth. The particular restrictions imposed on domains can vary based on the desires of the owner or administrator of domain administrator 102. Additionally, different restrictions can be imposed on different domains, or alternatively the same restrictions can be imposed on all domains.

Domain request approval module 224 accesses domain information store 230 and verifies that allowing device 202 to join the requested domain does not violate any of the restrictions imposed on the requested domain. If allowing device 202 to join the requested domain does not violate any of the restrictions imposed on the requested domain, and if the user credentials are verified, then device 202 is permitted to join the domain. However, if allowing device 202 to join the requested domain does violate a restriction imposed on the requested domain, or if the user credentials cannot be verified, then device 202 is not permitted to join the domain. An indication that the domain join request has failed can be returned to device 202, optionally including a description of why the request failed.

If device 202 is permitted to join the domain, then device binding encryption module 228 generates domain membership license 222 and binds license 222 to device 202. Binding license 222 to device 202 allows device 202 to use license 222 to access content using the content licenses as discussed in more detail below, but prevents other devices from using license 222 to access content.

Figure 3:
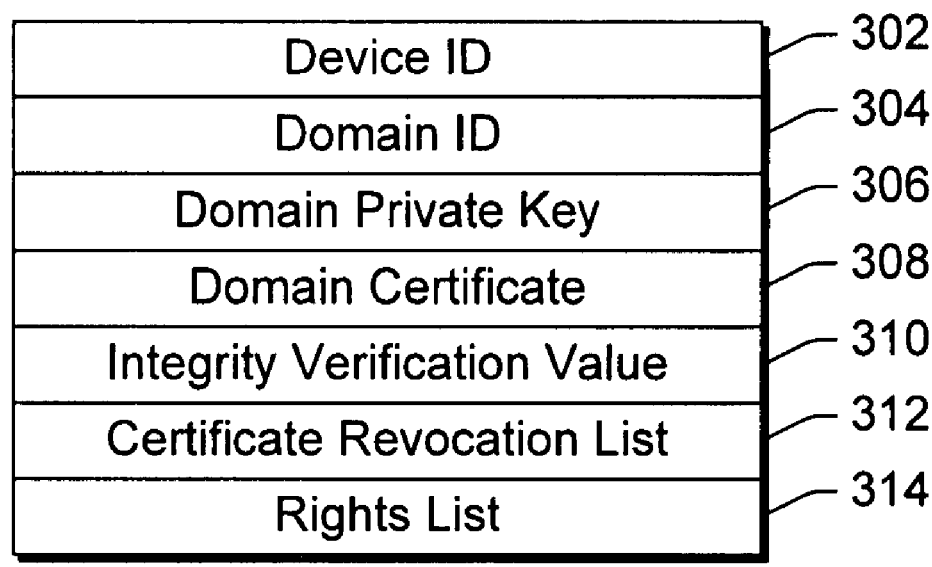
FIG. 3 illustrates an example domain membership license.

FIG. 3 illustrates an example domain membership license 300. Domain membership license 300 can be, for example, license 222 of FIG. 2. Domain membership license 300 includes a device ID 302, a domain ID 304, a domain private key 306, a domain certificate 308, an integrity verification value 310, a certificate revocation list 312, and a rights list 314. Domain membership license 300 is associated with a particular device and a particular domain (e.g., the device making request 220 in FIG. 2, and the domain that the device is requesting to join).

Device ID 302 is an identifier of the device to which domain membership license 300 is being issued. Device ID 302 uniquely identifies the device within this particular domain. Universally unique identifiers can alternatively be used. Device ID 302 is typically assigned by a trust authority, such as a trust authority 120 of FIG. 1. For example, a trust authority 120 can provide a device ID 302 to a device manufacturer along with a digital certificate that attests that trust authority 120 issued that device ID 302. The device manufacturer, in turn, can assign that device ID 302 (and corresponding digital certificate) to a particular device that it manufactures. By way of another example, a trust authority 120 can authorize a device manufacturer to generate device ID 302, and the device manufacturer generates and assigns the device ID 302 to a device. In this example, trust authority 120 generates a digital certificate that attests that the device manufacturer is authorized to generate device ID 302, and the device manufacturer generates a digital certificate that attests that the device manufacturer is authorized to issue that device ID 302.

Alternatively, device ID 302 can be assigned by other components or devices, such as domain administrator 102. Regardless of the manner in which the device ID 302 is assigned, the corresponding digital certificate or chain of digital certificates can be used by the device to prove that it is a trusted device.

Domain ID 304 is an identifier of the domain that license 300 applies to. This is the particular domain that the device has requested to join, as discussed above with respect to FIG. 2. Domain ID 304 uniquely identifies the domain among all domains managed by domain administrator 102. Domain ID 304 is typically assigned by domain administrator 102, although may alternatively be assigned by other components or devices. Alternatively, domain ID 304 may be derived by the domain administrator 102 from the user credentials.

Domain private key 306 is the private key of a public/private key pair of this particular domain. Each domain has its own public/private key pair, which can be stored, for example, in domain information store 230 of FIG. 2. The public/private key pair is typically generated by domain administrator 102, although may alternatively be assigned by other components or devices.

Domain certificate 308 is a digital certificate associated with this particular domain. This digital certificate can include various information describing the domain, such as the public key of the public/private key pair of the domain, and is digitally signed using the private key of domain administrator 102. This digital signature allows another component to verify, if desired, that the certificate was actually generated by domain administrator 102 and has not been tampered with.

Integrity verification value 310 is a value that can be used to verify the integrity of license 300. This value can be generated in accordance with any of a variety of different verification techniques, such as a checksum over the portions (optionally except value 310) of license 300, a digital signature over one or more portions (optionally except value 310) of license 300, and so forth.

Certificate revocation list 312 is a list of revoked certificates. Over time, it is possible that particular domain certificates become invalid. This can occur, for example, because a domain private key is compromised or possibly compromised by a mischievous user or device. Such revoked domain certificates are identified in list 312 so that other devices or components know that they should not be relied on.

Rights list 314 is a set of rights and/or restrictions for the domain associated with license 300. As discussed above, various restrictions can be imposed on a domain, and those restrictions can be identified in rights list 314.

Returning to FIG. 2, device binding encryption module 228 binds license 222 to device 202. This binding can be achieved in different manners. In one or more embodiments, this binding is achieved by encrypting at least a portion of license 222 (e.g., at least domain private key 306 of FIG. 3) with the public key of device 202. The public key of device 202 can be obtained from the device certificate received as part of request 220, or alternatively can be obtained from another source. Alternatively, this binding can be achieved in other manners, such as by encrypting at least a portion of license 222 with a key and securely issuing this key to device 202, by employing a secure key exchange protocol to establish a symmetric key between device 202 and domain administrator 102 and encrypting at least a portion of license 222 with the symmetric key (and then relying on DRM module 206 to protect license 222), and so forth.

It should be noted that, regardless of the manner in which domain membership license 222 is bound to device 202, at least domain private key 306 in license 222 should be encrypted (e.g., using the public key of device 202). Encrypting at least this portion (key 306) of license 222 protects the private key of the domain from being obtained by other devices that might be eavesdropping on the communication link between device 202 and domain administrator 102. In situations where the communication link between device 202 and domain administrator 102 is secure, then such encryption of key 306 need not be performed.

Device 202, upon receipt of domain membership license 222, stores license 222 in domain license store 212. License 222 can be stored in store 212 in encrypted form, or alternatively if license store 212 is secure then license 222 can be stored in decrypted form.

Additionally, it should be noted that situations can arise where the requested domain does not yet exist. In such situations, domain creation module 226 creates the requested domain (optionally only after domain request approval module 224 verifies the user credentials, as discussed below) in response to receiving a join-domain request for a domain that does not exist. Alternatively, a separate create domain request may be received by domain administrator 102 from device 202, and the domain may be created in response to this request. A create domain request would include, for example, the user credentials of the user that the domain is to be associated with.

To create a new domain request, the received user credentials are validated. If the user credentials cannot be validated, then the creation operation fails, and an indication of this failure (optionally with an explanation of why the operation failed) can be returned to device 202. Domain administrator 102 creates a new domain including the various information for the domain, including a domain ID, a public/private key pair of the domain, a domain certificate, and any restrictions to be imposed on the domain. All of this information describing the domain is stored in domain information store 230.

Requests to join a domain and to create a domain are discussed above. Various other requests can also optionally be supported by domain administrator 102. One such request is a remove device request to have a device removed from a domain. The remove device request can be submitted by the device that is being removed from the domain, or alternatively another device. The remove device request includes as parameters a device ID (the device ID that was included as part of the domain membership license 222 received by the device when the device joined the domain) and user credentials for the user associated with the domain. Domain administrator 102 verifies the user credentials, and returns a failure indication to the device submitting the remove device request if the user credentials are not verified as being correct (optionally including an explanation of why the request failed). If the user credentials are verified as being correct, then domain information store 230 is updated to reflect that the device is no longer part of the domain, and an indication that the device has been removed from the domain is optionally returned to the device submitting the remove device request.

Another request optionally supported by domain administrator 102 is a renew domain membership request. In some situations, a domain may expire and need to be renewed. In such situations, a device submits a renew domain membership request to renew the domain. The renew domain membership request includes as parameters a device certificate of the device submitting the request, user credentials of the user associated with the domain being renewed, a domain ID of the domain being renewed, and optionally a user-friendly device ID of the device submitting the request. The user credentials are verified analogous to the discussion above regarding the join-domain request, and if verified as correct then the domain identified in the request is renewed (e.g., the expiration date and/or time is reset, or a new domain membership license with a new expiration date and/or time is set). If the user credentials are not verified as correct then domain administrator 102 returns a failure indication to the device submitting the renew domain membership request (optionally including an explanation of why the request failed). However, if the user credentials are verified as correct then a new (or updated) domain membership license is returned to the device submitting the renew domain membership request analogous to the response to the join-domain request discussed above.

Another request optionally supported by domain administrator 102 is an add user credentials request. In one or more embodiments multiple user credentials can be associated with the same domain. In such embodiments, an add user credentials request can be submitted to domain administrator 102 by a device that is already a member of the domain or alternatively another device. The add user credentials request includes as parameters existing user credentials and new user credentials. The existing user credentials are the user credentials of a user that is already associated with the domain. The new user credentials are the user credentials of a new user that the request is requesting to add to the domain. Both the existing user credentials and the new user credentials are verified. If both user credentials are not verified as correct then domain administrator 102 returns a failure indication to the device submitting the add user credentials request (optionally including an explanation of why the request failed). However, if both user credentials are verified as correct then an indication that the new user has been added to the domain is returned to the device submitting the add user credentials request.

Various other requests can optionally be supported by domain administrator 102. An example of such a request is a domain-merge request that allows two or more domains to be merged together into a single merged domain, with the devices included in the two or more domains becoming part of the single merged domain. Another request optionally supported by domain administrator 102 is a domain split request that allows a single domain to be split into two or more domains, and the devices that were previously included in the single domain being included in one of the two or more domains.

Device 202 communicates with content provider 104 to obtain pieces of protected content. Protected content can be obtained by device 202 before it joins a domain, after it joins a domain, or concurrently with joining a domain. The protected content is bound to a particular domain via its content license, as discussed in more detail below. Device 202 submits a content request 240 to content provider 104, requesting one or more pieces of protected content. In response to content request 240, content provider 104 obtains the requested piece(s) of content from content store 244 and returns the pieces of protected content 242 to device 202. Device 202 stores the received protected content 242 in device content store 208.

Content provider 104 can optionally impose various restrictions on which particular pieces of content from content store 244 device 202 is permitted to access. For example, if a particular DRM system supports different security levels, the content provider may make higher quality content available only to devices with the highest security level(s).

Protected content 242 is protected using encryption. Each piece of content obtained by a device 202 as protected content 242 is encrypted using a content key. Thus, each device obtaining protected content 242 typically obtains the same content encrypted using the same content key. Thus, devices can share pieces of protected content 242 and the content remains protected as long as the content key is only made available to authorized devices. Device 202 obtains a content license in order to decrypt the pieces of protected content, as discussed in more detail below.

It should be noted that, in addition to the content key protection mechanism discussed herein, individual DRM systems may optionally employ additional protection mechanisms. Such additional protection mechanisms are specific to the individual DRM systems and can vary for different DRM systems.

Each piece of protected content 242 has associated metadata that can include a key ID and a license server ID. Alternatively, the metadata may include a content ID from which a key ID can be derived. This metadata can be included in an unencrypted header of the piece of protected content 242, or alternatively can be obtained elsewhere. The key ID uniquely identifies the piece of content, allowing the appropriate content license to be associated with piece of content. The license server ID identifies a particular license server (e.g., by uniform resource locator (URL)) from which the content license can be obtained, or to identify another location or server from which the content license can be obtained.

Device 202 communicates with license server 106 to obtain content licenses for pieces of protected content that were obtained from content provider 104. License server 106 is typically operated by the same party as operates content provider 104, but alternatively could be operated by a third party (e.g., a license clearinghouse). The particular license server 106 to access can be identified, for example, from the license server ID associated with the protected content. Device 202 sends a content license request 252 to license server 106. Content license request 252 includes various parameters to identify the content for which the license is being requested as well as domain 204 that device 202 is part of. In one or more embodiments, these parameters include a key ID, a domain ID, and a domain certificate. The key ID identifies the particular piece of protected content for which the content license is being requested. As discussed above, this key ID is obtained by device 202 from content provider 104 along with the protected content.

The domain ID is an identifier of domain 204 that device 202 is part of. The domain ID identifies the particular domain to which the content license should be bound. As discussed above, the domain ID is obtained by device 202 from domain administrator 102 as part of domain membership license 222. Alternatively, the domain ID may not be included and the public key included in the domain certificate can be relied on to identify the domain.

The domain certificate is a digital certificate associated with the domain 204 that device 202 is part of. The domain certificate includes the public key of domain 204, allowing the content license to be bound to domain 204 by encrypting at least the content key with the public key of domain 204. As discussed above, the domain certificate is obtained by device 202 from domain administrator 102 as part of domain membership license 222.

In response to content license request 252, license server 106 validates the domain certificate included in request 252. License server 106 may communicate with domain administrator 102 to validate the domain certificate. Domain administrator 102 maintains a list of revoked domain certificates, and can communicate this list to license server 106 (or alternatively check whether a domain certificate provided by license server 106 has been revoked and return an indication of such to license server 106). Alternatively, license server 106 may check the certificate revocation list for the domain certificate.

Domain administrator 102 may optionally maintain different versions of domain certificates, allowing domains to expire and requiring them to be renewed. Domain administrator 102 can check an expiration date included in the domain certificate to see if the domain certificate has not expired (and thus is the most recent version of the domain certificate for that domain). Alternatively, domain administrator 102 can check a domain certificate provided by license server 106 to determine whether the domain certificate is the most recent version of the domain certificate for that domain, or alternatively send a list of domain certificates and their versions to license server 106 for server 106 to perform the check. If the domain certificate is not the most recent version for that domain, then domain administrator and/or license server 106 can indicate such to device 202 so that device 202 can renew the domain (e.g., using a renew domain membership request discussed above).

License server 106 includes a license request approval module 256, a domain binding encryption module 258, and a content license generator 260. Modules 256 and 258, and generator 260 can be implemented on the same device, or alternatively can be implemented on multiple devices.

If the domain certificate has been revoked (and if revisions are being used then if the domain certificate is not the most recent), then license request approval module 256 indicates to device 202 that the request has failed. An explanation of why the request failed can optionally be returned to device 202 as well.

If the domain certificate has not been revoked (and if versions are being used, then if the domain certificate is also the most recent version), then license request approval module 256 approves the request. Content license generator 260 generates a content license for the requested pieces of content. The content license includes a content key, a domain ID, usage rights, verification information, and certificate revocation list information.

The content key is the key to be used to decrypt the piece of content identified by the key ID in request 252. The domain ID is the identifier of the domain to which the content is to be bound, as identified by the domain ID in request 252. The usage rights describe the rights that are being licensed to device 202. Any of a variety of rights can be listed in these usage rights, and these rights are enforced by DRM module 206 of device 202. Examples of such rights include restrictions on how many times the piece of content can be played on a particular device or in a particular domain, whether the piece of content can be burned to a CD, an amount of time that the piece of content can be played back before a new content license needs to be obtained, and so forth.

The verification information is an integrity verification value that can be used to verify the integrity of the content license. This value can be generated in accordance with any of a variety of different verification techniques, such as a checksum over the portions (optionally except the integrity verification value) of the content license, a digital signature over one or more portions (optionally except the integrity verification value) of the content license, and so forth.

Domain binding encryption module 258 binds the content license generated by content license generator 260 to the domain identified in request 252. This binding can be achieved in different manners. In one or more embodiments, this binding is achieved by encrypting at least a portion of the content license (e.g., at least the content key) with the public key of the domain identified in request 252. The public key of the domain identified in request 252 is included in request 252. Alternatively, this binding can be achieved in other manners, such as by encrypting at least a portion of the content license with a key and securely issuing this key to device 202, by employing a secure key exchange protocol to establish a symmetric key between device 202 and license server 106 and encrypting at least a portion of the content license with the symmetric key (and then relying on DRM module 206 to protect the content license), and so forth.

It should be noted that, regardless of the manner in which the content license is bound to the domain, at least the content key in the content license should be encrypted (e.g., using the public key of the domain identified in request 252). Encrypting at least this portion (the content key) of the content license protects the content key from being obtained by other devices that might be eavesdropping on the communication link between device 202 and license server 106. In situations where the communication link between device 202 and license server 106 is secure, then such encryption of the content key need not be performed.

The content license 254, bound to domain 204, is returned to device 202. Once device 202 has the content license for a piece of protected content, content playback module 214 is able to access the protected content and play back the protected content in decrypted form. The decryption is typically performed by DRM module 206, but may alternatively be performed by playback module 214 or alternatively another module (not shown). The content can be stored in device content store 208 in encrypted form, or alternatively in decrypted form (assuming, for example, that device content store 208 is secure).

It should be noted that, since the content license obtained for a piece of protected content is bound to the domain, any other device that is also in that domain can use the content license to access and play back the protected piece of content. Any other device that is in the same domain would have the private key of the domain and thus would be able to decrypt the content key in the content license. However, any other device that is not in the same domain would not have the private key of the domain and thus would not be able to decrypt the content key in the content license, and thus would not be able to decrypt the protected piece of content.

It should also be noted that in system 200, domain administrator 102, content provider 104, and license server 106 are illustrated as separate components or services. However, it is to be appreciated that one or more of domain administrator 102, content provider 104, and license server 106 can be implemented as a single component or service. In one or more embodiments, domain administrator 102 and license server 106 are implemented as a single component or service, or implemented on a single device. In one or more other embodiments, domain administrator 102 and license server 106 are separate components or services, but support only a single type of DRM management technique. In one or more other embodiments, domain administrator 102 and license server 106 are separate components or services, and support a variety of different types of DRM management techniques.

It is also to be appreciated that, in such situations where one or more of domain administrator 102, content provider 104, and license server 106 are implemented as a single component or on a single device, some of the information discussed above may not be used. For example, if content provider 104 and license server 106 were implemented as a single component, the content license could be returned along with the protected content, and the key ID and license server ID could be dropped from the protocol.

Additionally, in one or more embodiments a device 202 can operate as a local domain administrator to issue a temporary domain membership license to other devices. Various restrictions can be placed on such a temporary domain membership license that make the temporary license more restrictive than the license 222 obtained by device 202. For example, the temporary license may be valid for only a short amount of time (e.g., 1-3 days), the temporary license may not permit new protected content to be obtained but would allow content previously-obtained by another device that is in the domain to be played back, and so forth. Such local domain administrator functionality would allow a device already in a domain to temporarily add another device to the domain and allow that other device to temporarily play back all the content that had already been downloaded by another device in that domain.

Figure 4:
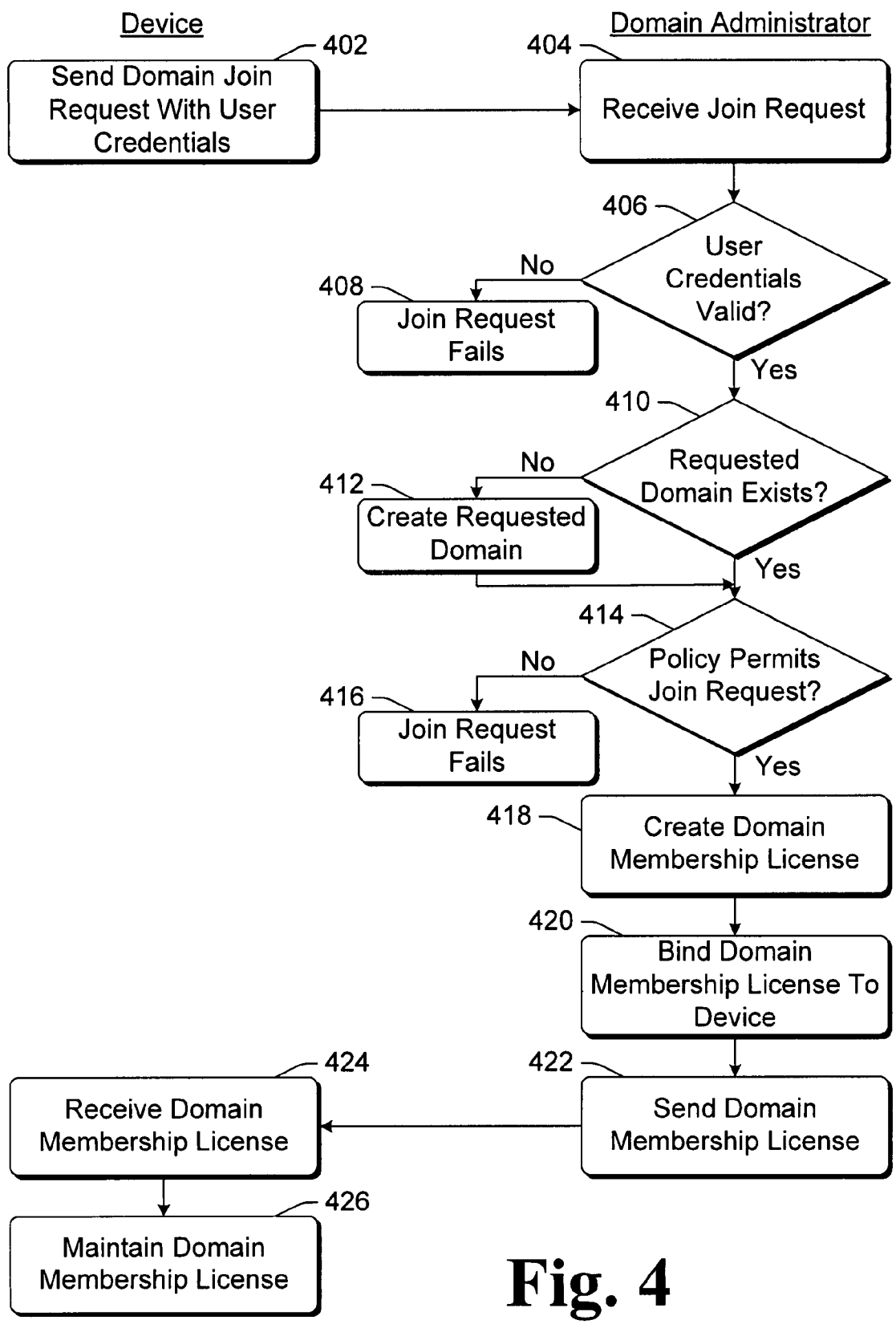
FIG. 4 is a flowchart illustrating an example process for obtaining a domain membership license.

FIG. 4 is a flowchart illustrating an example process 400 for obtaining a domain membership license. Process 400 can be implemented in software, firmware, hardware, or combinations thereof. Acts of process 400 illustrated on the left-hand side of FIG. 4 are carried out by a device, such as device 202 of FIG. 2. Acts of process 400 illustrated on the right-hand side of FIG. 4 are carried out by a domain administrator, such as domain administrator 102 of FIG. 2. Process 400 is an example process for obtaining a domain membership license; additional discussions of obtaining a domain membership license are included above.

Initially, a domain join request (e.g., join-domain request 220 of FIG. 2) including user credentials is sent by the device (act 402). This domain join request may optionally include a device certificate attesting to the trustworthiness of the device. The domain join request is received by the domain administrator (act 404), which checks whether the user credentials are valid (act 406). The domain administrator may optionally also check whether the device certificate is valid. If the user credentials are not valid (or if the device certificate is not valid), then the join request fails (act 408) and an indication of such is optionally returned to the device.

However, if the user credentials are valid (and, if the device certificate is being checked, then if the device certificate is also valid), a check is made as to whether the requested domain exists (act 410). If the requested domain does not exist, then the requested domain is created (act 412). After creation of the requested domain, or if the domain already exists, a check is made as to whether the domain policy permits the device to join the request (act 414). As discussed above, various restrictions can be imposed on domains and the domain administrator checks whether the domain policy identifying such restrictions would permit the device to join the domain.

If the domain policy does not permit the device to join the domain, then the join request fails (act 416) and an indication of such is optionally returned to the device. However, if the domain policy does permit the device to join the domain, a domain membership license is created (act 418). The domain membership license is, for example, a license 300 discussed above with respect to FIG. 3. The domain membership license is bound to the device (act 420), and sent to the device (act 422). The device receives the domain membership license (act 424) and maintains the license in its license store (act 426).

Figure 5:
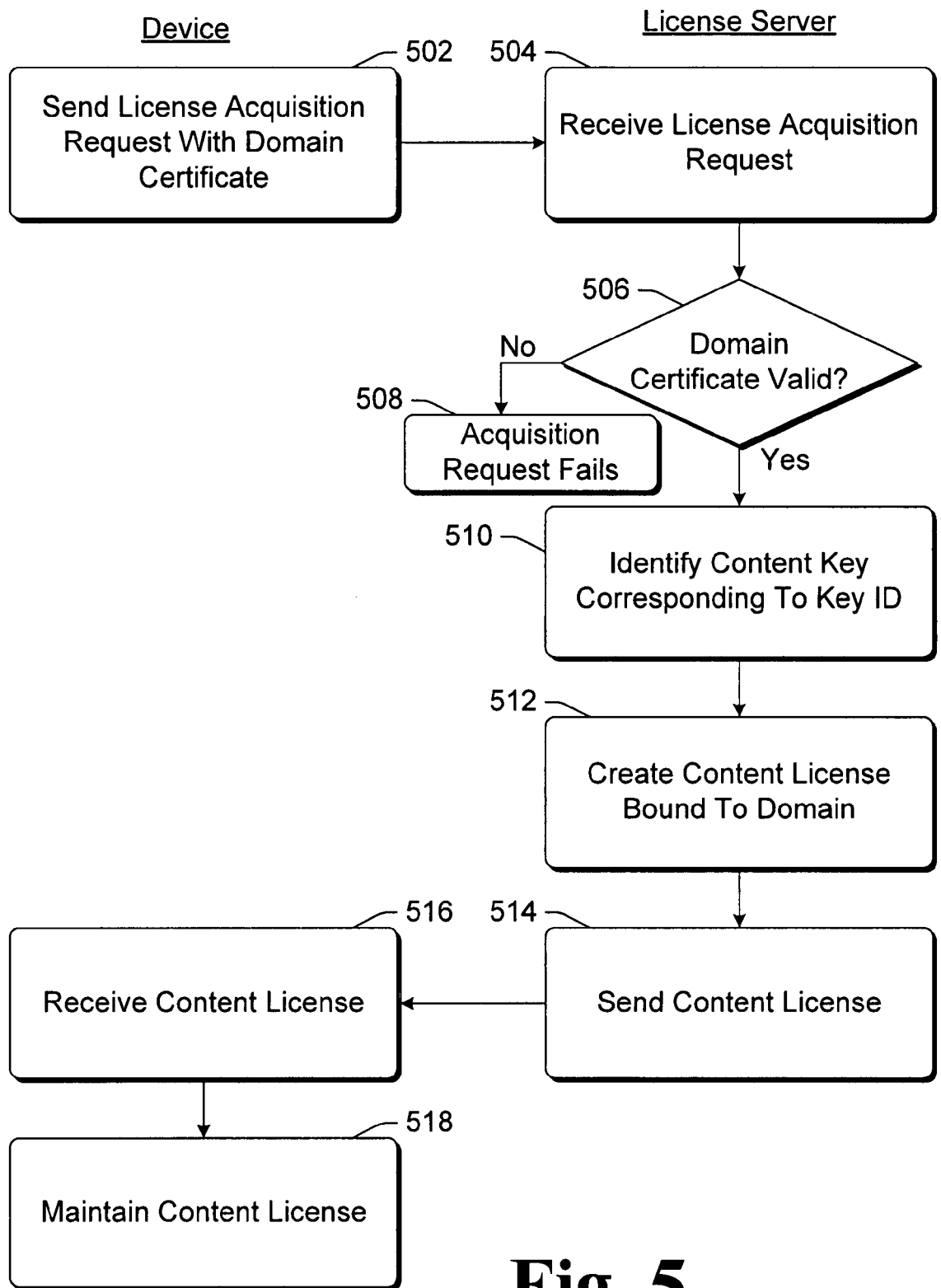
FIG. 5 is a flowchart illustrating an example process for obtaining a content license bound to a domain.

FIG. 5 is a flowchart illustrating an example process 500 for obtaining a content license bound to a domain. Process 500 can be implemented in software, firmware, hardware, or combinations thereof. Acts of process 500 illustrated on the left-hand side of FIG. 5 are carried out by a device, such as device 202 of FIG. 2. Acts of process 500 illustrated on the right-hand side of FIG. 5 are carried out by a license server, such as license server 106 of FIG. 2. Process 500 is an example process for obtaining a content license bound to a domain; additional discussions of obtaining a content license bound to a domain are included above.

Initially, the device sends a license acquisition request to the license server, the request optionally including a domain certificate, a domain ID, and a content ID (act 502). The request is received by the license server (act 504), which checks whether the domain certificate included in the request is valid (act 506). This check can be accomplished, for example, by accessing a domain administrator as discussed above. If the domain certificate is not valid, then the license acquisition request fails (act 508) and an indication of such is optionally returned to the device.

However, if the domain certificate is valid, then the content key corresponding to the key ID from the request is identified (act 510). The content license is created and bound to the domain identified in the request (act 512). As discussed above, the public key included in the domain certificate can be used to bind the content license to the domain identified in the request.

The content license is then sent to the device (act 514). The device receives the content license (act 516), and maintains the content license in its content license store (act 518).

With respect to the flowcharts of FIGS. 4 and 5, it is to be appreciated that the processes illustrated are only examples, and that the acts can be performed in different orders than those shown. Additionally, it is to be appreciated that one or more of the illustrated acts can be combined into a single act, and that a single act can be separated into multiple acts.

As can be seen from the discussions herein, the domain management for digital media discussed herein can be used across different types of DRM systems. The particular manner in which DRM techniques are employed on the various devices is left up to the DRM module to implement. However, the protection of the content and the binding of the content is generic across the different types of DRM systems. Once protected content is obtained by a device and decrypted using the content key that is obtained as discussed herein, the protection of the content is handled by the DRM module of the device.

As discussed above, the content protection is domain-based rather than device-based. Content is bound to a particular domain, allowing all devices in that particular domain to access and use the content. The techniques discussed herein for protecting content and binding content to domains can leverage multiple DRM systems currently being used. An entirely new DRM management system need not be developed. Rather, current DRM systems can be modified to support the domain-based techniques discussed herein, with such modification requiring very little changing of the current DRM systems.

Additionally, the domain management for digital media discussed herein supports different DRM systems within the same domain. This support is provided in a user-friendly manner, allowing a user to use devices with these different DRM systems without any knowledge of the differences between the different DRM systems or even that his or her devices use different DRM systems. Examples of such uses follow.

A user can have multiple devices in his or her domain. Assume that a first device (device A) uses a first DRM system (DRM system X). When the user desires to play back a new piece of protected content on device A, device A obtains the domain membership license if it has not already done so, obtains the protected content, and obtains the content license as discussed above from a license server that also uses DRM system X. The user can then play back the new piece of content on device A.

Now, assume that the user also has a second device (device B) in his or her domain that also uses DRM system X. The user can easily play back this new piece of content on device B by transferring the content from device A to device B, or alternatively by having device B obtain the content from a content provider (e.g., the same content provider from which device A obtained the content). Device B also obtains the domain membership license if it has not already done so, and obtains the content license as follows. Device B can obtain the content license from the license server (e.g., license server 106 of FIG. 2). Alternatively, as the content license already obtained by device A is bound to the domain, device B could obtain the content license from device A (device B can use this content license to play the content because device B is a member of the domain and therefore has the domain private key, which is required to decrypt the content key). The user can then play back the new piece of content on device B.

Now, assume that the user also has a third device (device C) in his or her domain that uses a second DRM system (DRM system Y). The user can easily play back this new piece of content on device C by having device C obtain the domain membership license if it has not already done so and obtain the content license, analogous to the preceding discussion regarding device B. However, as the piece of content was obtained by device A using DRM system X, the piece of content can, and typically is, stored in a format that is incompatible with DRM system Y. So, the piece of content is converted to DRM system Y. This conversion is typically referred to as transcription (or transcryption), and such transcription techniques are well-known to those skilled in the art. The conversion can include, for example, one or more of decrypting the piece of content and re-encrypting it for DRM system Y, key management, and rights mapping. The conversion from DRM system X to DRM system Y can be performed by device A or by device C, or alternatively by some other component such as domain administrator 102 or another component (not shown). The converted piece of content can then be played back using DRM system Y.

It should be noted that different DRM systems operate in different manners. For example, some may employ public key encryption but use different algorithms, use different key lengths, and so forth. Additionally, some DRM systems may employ protection mechanisms other than public key encryption, such as symmetric key encryption. Given these different DRM systems, domain administrator 102 of FIG. 2 maintains, as part of the domain information it maintains for each domain, the different DRM systems used by the different devices that are part of each domain. For example, domain administrator 102 maintains a record of which type of encryption the DRM system uses, the length (the number of bits) in the keys used by the DRM system, and so forth. Domain administrator 102 can determine which DRM system is used by a particular device in different manners, such as being notified of the DRM system by the device as part of the join-domain request, being notified by the device or another component or module via a separate message or request, and so forth. When sending a domain membership license to a device, domain administrator 102 includes in the domain membership license the appropriate information for the DRM system used by that device.

Figure 6:
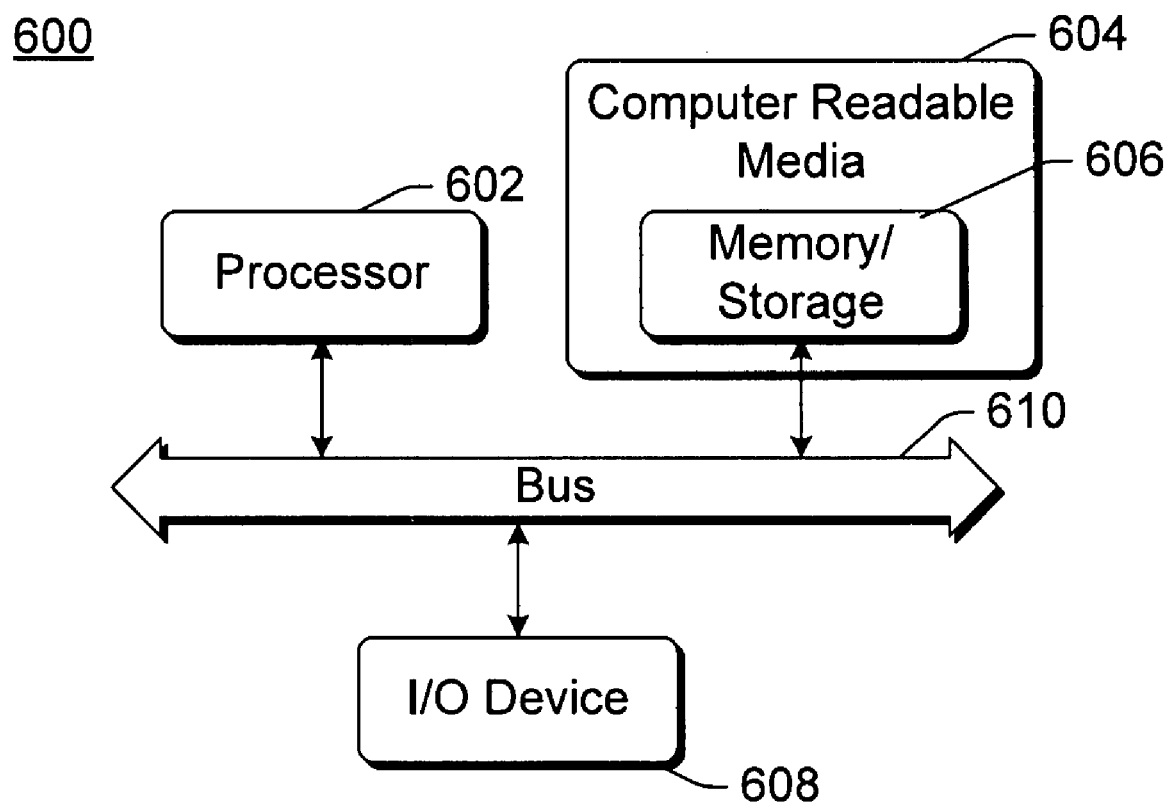
FIG. 6 illustrates an example computing device that can be configured to implement the domain management for digital media discussed herein.

FIG. 6 illustrates an example computing device 600 that can be configured to implement the domain management for digital media discussed herein. Computing device 600 can be, for example, a device 112 or 114 of FIG. 1, a device 202, or can implement a domain administrator 102, content provider 104, and/or license server 106 of FIGS. 1 and 2, or can implement a trust authority 120 of FIG. 1. Computing device 600 can be any of a variety of different computing devices, such as a desktop computer, handheld computer, laptop computer, server computer, automotive computer, cell phone, personal digital assistant (PDA), game console, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon instructions that, when executed by one or more processors of a device, cause the one or more processors to:
   access a domain administrator to obtain a domain membership license indicating that the device is part of a domain that includes multiple devices associated with a user of the device;
   obtain multiple pieces of protected content from multiple content providers, two or more of the multiple content providers employing different digital rights management systems; and
   access a license server to obtain, for each piece of protected content, a content license that is bound to the domain and that permits the device to play back the piece of content to the user.

2. One or more computer storage media as recited in claim 1, the one or more computer readable media being implemented in a content playback device.

3. One or more computer storage media as recited in claim 1, wherein to access the license server is further to present to the license server a domain certificate identifying a public key of a public/private key pair of the domain that can be used by the license server to bind the content license to the domain, the domain certificate having been received by the device from the domain administrator.

4. One or more computer storage media as recited in claim 3, wherein the instructions further cause the one or more processors to:
receive, from the license server, the content license including a content key to be used to decrypt the piece of content, the content key being encrypted with the public key of the domain.

5. One or more computer storage media as recited in claim 1, each of the multiple pieces of protected content having an associated key ID identifying the piece of protected content for which the content license is to be obtained, and an associated license server ID identifying the license server from which the content license is to be obtained.

6. One or more computer storage media as recited in claim 1, the domain membership license including:
a device identifier identifying the device;
a domain identifier identifying the domain;
a private key of a public/private key pair of the domain; and
a digital certificate for the domain.

7. One or more computer storage media as recited in claim 1, wherein to access the domain administrator is to:
send a join-domain request to the domain administrator, the join-domain request including user credentials for a user associated with the domain and a device certificate signed by a trust authority, the device certificate including a public key of a public/private key pair of the device.

8. One or more computer storage media as recited in claim 7, wherein the instructions further cause the one or more processors to:
receive, from the domain administrator in response to the join-domain request, a domain membership license including a private key of a public/private key pair of the domain to allow the device to decrypt a content key in a content key license that is bound to the domain.

9. One or more computer storage media as recited in claim 1, the device implementing a digital rights management module employing a different digital rights management system than is employed by another digital rights management module implemented in another device that is part of the domain.

10. One or more computer storage media as recited in claim 1, wherein the instructions further cause the one or more processors to:
transfer, to a second device of the multiple devices included in the domain that supports a same digital rights management system as the device, one of the multiple pieces of protected content and the content license for the one piece so that the second device can play back, using a domain membership license of the second device, the one piece.

11. One or more computer storage media as recited in claim 1, wherein the instructions further cause the one or more processors to:
convert one of the multiple pieces of content to a different digital rights management system than is used by the device; and
transfer, to a second device of the multiple devices included in the domain that supports the different digital rights management system, the converted piece of content so that the second device can play back, using a domain membership license of the second device corresponding to the different digital rights management system, the converted piece.

12. One or more computer storage media as recited in claim 1, wherein the instructions further cause the one or more processors to:
receive, from a second device of the multiple devices included in the domain, a piece of content and a content license for the one piece of content, the second device employing a different digital rights management system than the device;
send, to the domain administrator, one or both of the protected content protected for use with the different digital rights management system than is used by the device, and the content license corresponding to the different digital rights management system than is used by the device;
receive, from the domain administrator, the content license corresponding to the digital rights management system used by the device; and
play back the one piece of content.

13. A method comprising:
generating a domain membership license including:
a device identifier identifying a device to which the domain membership license is bound;
a domain identifier identifying a domain of which the device is a member;
a private key of a public/private key pair of the domain; and
a digital certificate for the domain; and
encrypting at least the private key of the domain.

14. A method as recited in claim 13, the domain membership license further including:
one or more rights granted to the device by the domain membership license.

15. A method as recited in claim 13, the digital certificate having been signed by the domain administrator.

16. A method as recited in claim 13, further comprising:
generating the domain membership license in response to a join-domain request received from the device, the join-domain request including user credentials for a user associated with the domain and a device certificate including a public key of a public/private key pair of the device to be used to bind the domain membership license to the device.

17. One or more computer storage media having stored thereon instructions that, when executed by one or more processors of a device, cause the one or more processors to implement a protocol enabling the device to access a domain administrator to join a domain that includes one or more additional devices associated with a user of the device, to download content from a content provider, and obtain a content license from a license server, the content license being bound to the domain and allowing the device to play back the content, the protocol operating to enable the device to join the domain, download the content, and obtain the license regardless of whether the domain administrator, the content provider, and the license server are implemented as part of a same service or different services.

18. One or more computer storage media as recited in claim 17, the domain administrator, the content provider, and the license server being implemented as part of the same service.

19. One or more computer storage media as recited in claim 17, the domain administrator, the content provider, and the license server each being implemented as a separate service.

20. One or more computer storage media as recited in claim 17, the protocol further operating to allow the license server to provide content licenses to devices included in the domain without knowledge of which devices are included in the domain.

* * * * *